US010556192B2

(12) United States Patent
Parker et al.

(10) Patent No.: US 10,556,192 B2
(45) Date of Patent: Feb. 11, 2020

(54) MOBILE SUPERCRITICAL EXTRACTOR SYSTEM WITH EVAPORATOR CHAMBER HAVING CONES AND RELATED METHODS

(71) Applicant: AG Equipment IP Holding Co. Inc., Amado, AZ (US)

(72) Inventors: David L. Parker, Amado, AZ (US); Scott Delarvin, Amado, AZ (US)

(73) Assignee: AG Equipment IP Holding Co, Inc., Amado, AZ (US)

( * ) Notice: Subject to any disclaimer, the term of this patent is extended or adjusted under 35 U.S.C. 154(b) by 0 days.

(21) Appl. No.: 16/324,620

(22) PCT Filed: Apr. 18, 2017

(86) PCT No.: PCT/US2017/028082
§ 371 (c)(1),
(2) Date: Feb. 11, 2019

(87) PCT Pub. No.: WO2018/089042
PCT Pub. Date: May 17, 2018

(65) Prior Publication Data
US 2019/0176053 A1    Jun. 13, 2019

Related U.S. Application Data

(60) Provisional application No. 62/421,552, filed on Nov. 14, 2016.

(51) Int. Cl.
*B01D 11/02* (2006.01)
(52) U.S. Cl.
CPC ...... *B01D 11/0203* (2013.01); *B01D 11/0207* (2013.01); *B01D 11/028* (2013.01); *B01D 11/0296* (2013.01)

(58) Field of Classification Search
CPC .................................................. B01D 11/0203
See application file for complete search history.

(56) References Cited

U.S. PATENT DOCUMENTS 3,969,196 A    7/1976  Zosel
4,548,755 A *  10/1985 Stahl ................. B01D 11/0203
                                                                  208/24

(Continued)

FOREIGN PATENT DOCUMENTS

| CN | 105521618 | 4/2016 |
| EP | 2404647   | 1/2012 |
| FR | 2754464   | 4/1998 |

OTHER PUBLICATIONS

Xiokang et al. CN 105521618 Apr. 27, 2016. English machine translation. (Year: 2016).*

*Primary Examiner* — Donald R Spamer
(74) *Attorney, Agent, or Firm* — Allen, Dyer, Doppelt + Gilchrist, PA

(57) ABSTRACT

A supercritical extractor system may include extractor chambers coupled to a supercritical fluid pump and configured to receive a matrix for an extraction process and a supercritical fluid from the supercritical fluid pump, and evaporator chambers coupled to the extractor chambers and configured to output an extractant from the matrix. Each evaporator chamber may include a body defining a cavity, a cone within the cavity, and arms coupled between an inner surface of the body and the cone. The supercritical extractor system may include a condenser coupled between the evaporator chambers and the supercritical fluid reservoir, and a controller coupled to the supercritical fluid pump, the extractor chambers, and the evaporator chambers and configured to monitor a characteristic during the extraction process.

20 Claims, 16 Drawing Sheets

(56) References Cited

U.S. PATENT DOCUMENTS

| | | | |
|---|---|---|---|
| 4,588,476 A | 5/1986 | Warzel | |
| 4,591,427 A * | 5/1986 | Krug | C10G 11/18 |
| | | | 208/153 |
| 7,344,736 B2 | 3/2008 | Whittle et al. | |
| 8,895,078 B2 | 11/2014 | Mueller | |
| 9,169,455 B2 | 10/2015 | Hamler et al. | |
| 9,327,210 B1 | 5/2016 | Jones | |
| 9,340,475 B2 | 5/2016 | Mona, III et al. | |
| 2002/0174977 A1 * | 11/2002 | Low | B01D 5/0009 |
| | | | 165/157 |
| 2008/0103193 A1 | 5/2008 | Castor et al. | |
| 2009/0304870 A1 * | 12/2009 | Rescio | B01D 11/0296 |
| | | | 426/72 |
| 2014/0046080 A1 | 2/2014 | Marentis | |
| 2014/0134069 A1 | 5/2014 | DeLine et al. | |
| 2014/0248379 A1 | 9/2014 | Mueller | |
| 2015/0283477 A1 | 10/2015 | Chess et al. | |
| 2016/0038437 A1 | 2/2016 | Whittle et al. | |
| 2016/0074450 A1 | 3/2016 | Hospodor et al. | |
| 2016/0074451 A1 | 3/2016 | Speier | |
| 2016/0144292 A1 * | 5/2016 | Crandall | B01D 11/0203 |
| | | | 422/281 |
| 2016/0228789 A1 * | 8/2016 | Joseph | B01D 11/0203 |
| 2017/0014731 A1 * | 1/2017 | Chess | B01D 11/0203 |

* cited by examiner

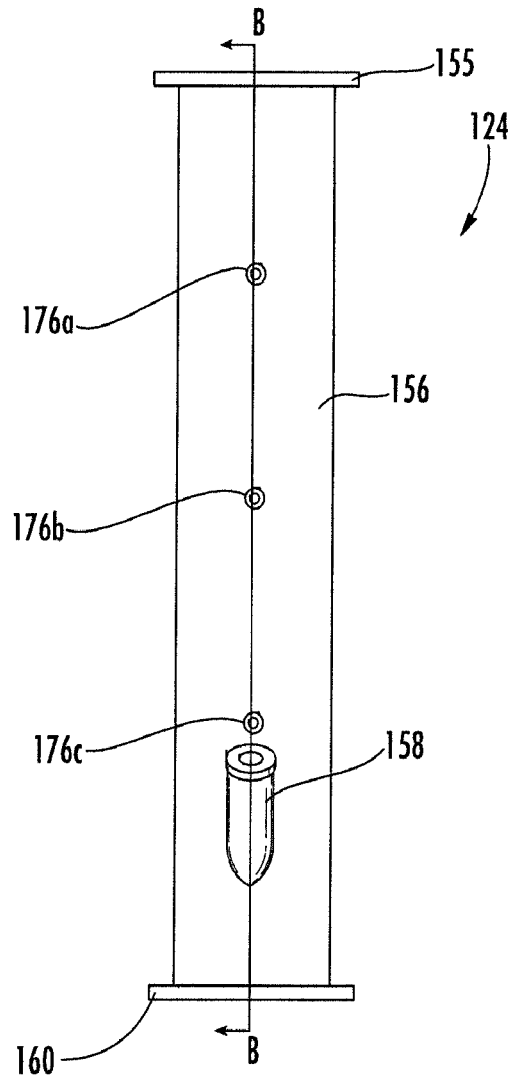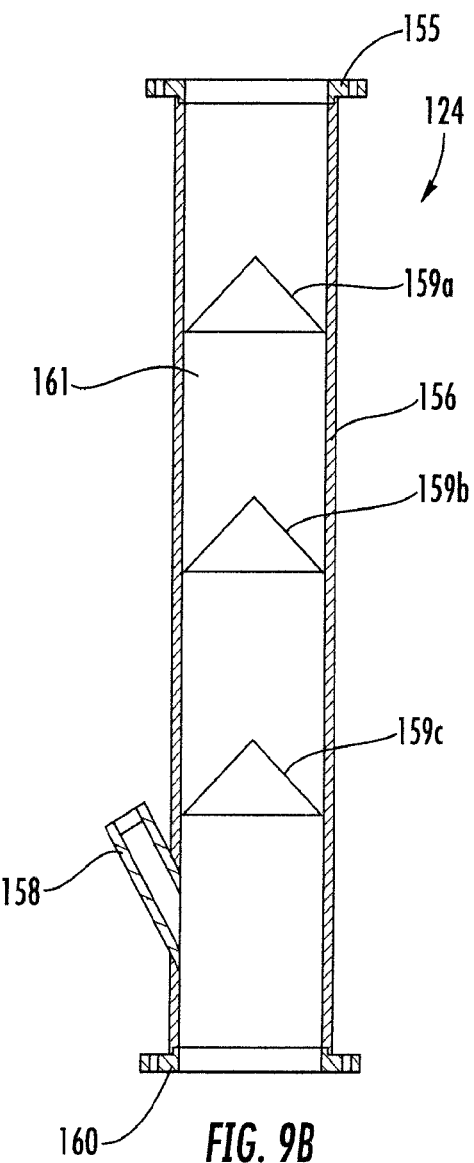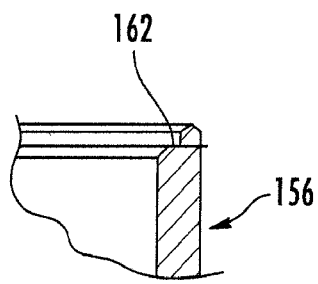
FIG. 9A
FIG. 9B
FIG. 9C

MOBILE SUPERCRITICAL EXTRACTOR SYSTEM WITH EVAPORATOR CHAMBER HAVING CONES AND RELATED METHODS

RELATED APPLICATION

This application is based upon prior filed U.S. Application No. 62/421,552 filed Nov. 14, 2016, the entire subject matter of which is incorporated herein by reference in its entirety.

TECHNICAL FIELD

The present disclosure relates to the field of supercritical extractor systems, and, more particularly, to supercritical $CO_2$ extractor systems and related methods.

BACKGROUND

The process of supercritical fluid extraction (SFE) comprises separating one component (i.e. the extractant) from another (i.e. the matrix) using supercritical fluids as the extracting solvent. A supercritical fluid comprises a substance at a temperature and pressure respectively above the critical temperature and the critical pressure, i.e. the critical point. In other words, a state where distinct liquid and gas phases do not exist.

A common supercritical fluid used in SFE is carbon dioxide ($CO_2$). In essence, in $CO_2$ SFE, the $CO_2$ is used as a solvent for the matrix. In a typical $CO_2$ SFE system, the SFE system includes an extractor receiving the matrix and supercritical $CO_2$, and an evaporator producing the extractant and waste $CO_2$. A typical drawback to earlier $CO_2$ extraction systems was that they were largely stationary and bulky. Accordingly, extraction applications may require substantial investment into equipment and maintenance. Also, some agrarian applications may not be suitable for this type of permanent installation.

SUMMARY

In view of the foregoing background, it is therefore an object of the present disclosure to provide a supercritical extractor system that is efficient and mobile.

This and other objects, features, and advantages in accordance with the present disclosure are provided by a supercritical extractor system comprising a supercritical fluid reservoir configured to store a supercritical fluid, and a supercritical fluid pump coupled to the supercritical fluid reservoir. The supercritical extractor system includes a plurality of extractor chambers coupled to the supercritical fluid pump and configured to receive a matrix for an extraction process and the supercritical fluid from the supercritical fluid pump, and a plurality of evaporator chambers coupled to the plurality of the extractor chambers and configured to output an extractant from the matrix. Each evaporator chamber comprises a body defining a cavity therein, at least one cone within the cavity, and a plurality of arms coupled between an inner surface of the body and the at least one cone. The supercritical extractor system includes a condenser coupled between the plurality of evaporator chambers and the supercritical fluid reservoir, and a controller coupled to the supercritical fluid pump, the plurality of extractor chambers, and the plurality of evaporator chambers and configured to monitor at least one characteristic during the extraction process. Advantageously, the supercritical extractor system may have a smaller footprint, thereby allowing for mobile deployment.

For example, the supercritical fluid may include supercritical $CO_2$. In some embodiments, the body may comprise a cylindrical body. The at least one cone may define an annular recess between the at least one cone and the inner surface of the cylindrical body.

Additionally, each extractor chamber may comprise a cylindrical body defining a cavity therein. The plurality of extractor chambers may comprise extractor chambers of differing capacities. The condenser may comprise a plate heat exchanger. The supercritical fluid pump may comprise a frame, a pump carried by the frame, and an electric motor coupled to the pump and carried by the frame. The at least one characteristic may include a plurality thereof comprising respective temperature values for the plurality of extractor chambers and respective temperature values the plurality of evaporator chambers.

Another aspect is directed to a method for making a supercritical extractor system. The method includes providing a supercritical fluid reservoir configured to store a supercritical fluid, coupling a supercritical fluid pump to the supercritical fluid reservoir, and coupling a plurality of extractor chambers to the supercritical fluid pump and configured to receive a matrix for an extraction process and the supercritical fluid from the supercritical fluid pump. The method includes coupling a plurality of evaporator chambers to the plurality of the extractor chambers and configured to output an extractant from the matrix. Each evaporator chamber comprises a body defining a cavity therein, at least one cone within the cavity, and a plurality of arms coupled between an inner surface of the body and the at least one cone. The method includes coupling a condenser between the plurality of evaporator chambers and the supercritical fluid reservoir, and coupling a controller to the supercritical fluid pump, the plurality of extractor chambers, and the plurality of evaporator chambers and configured to monitor at least one characteristic during the extraction process.

BRIEF DESCRIPTION OF THE DRAWINGS

FIG. 9A is a schematic side elevational view of the evaporator chamber from the supercritical extractor system of FIG. 2.

FIG. 9B is a schematic cross-sectional view of the evaporator chamber from the supercritical extractor system of FIG. 9A along line B-B.

FIG. 9C is an enlarged portion of the schematic cross-sectional view of FIG. 9B.

DETAILED DESCRIPTION

Figure 1:
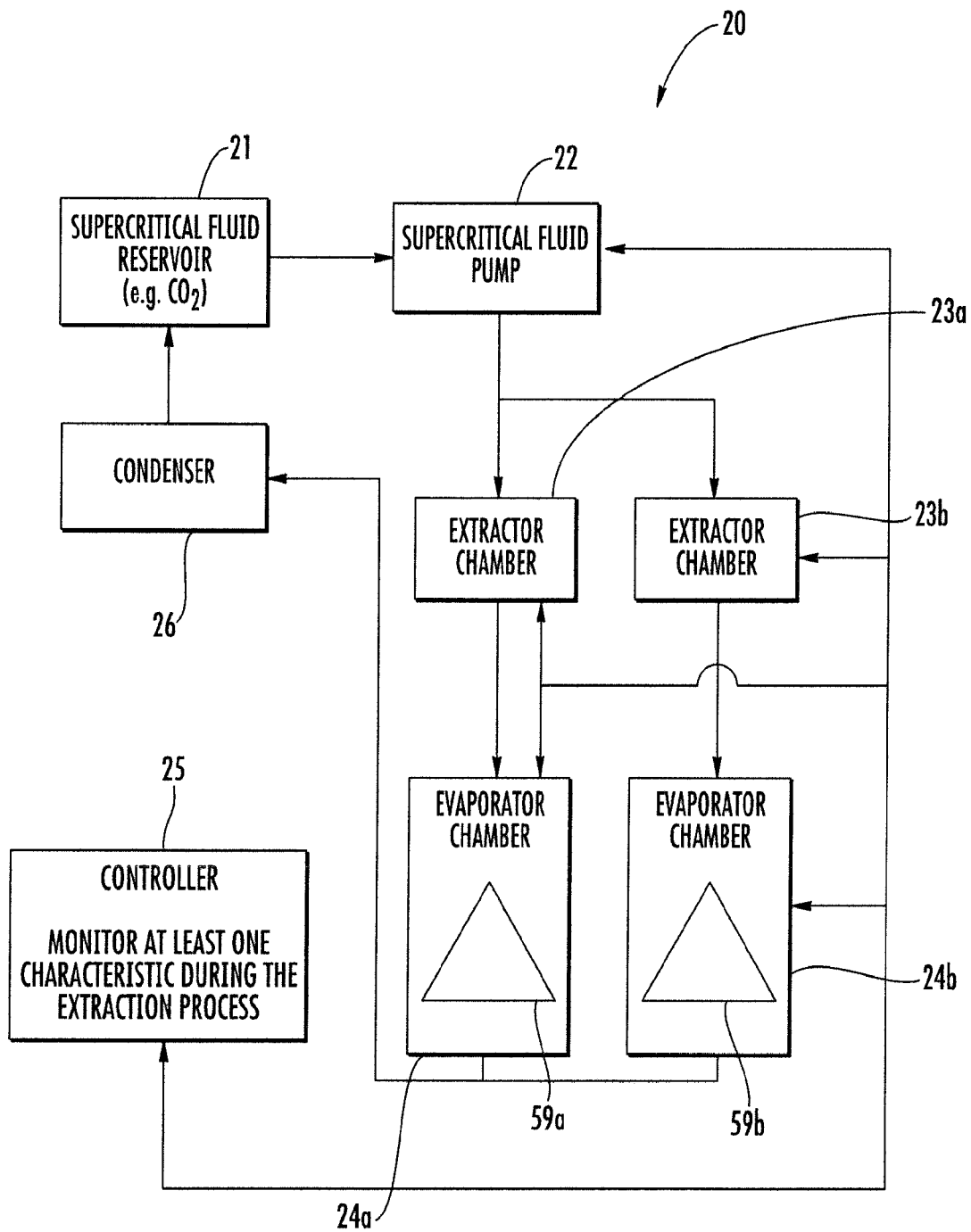
FIG. 1 is a schematic diagram of a supercritical extractor system, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Referring initially to FIG. 1, a supercritical extractor system 20 according to the present disclosure is now described. The supercritical extractor system 20 includes a supercritical fluid reservoir 21 configured to store a supercritical fluid. The supercritical fluid may comprise supercritical $CO_2$, and additional co-solvents, such as ethanol and methanol, for example. The supercritical extractor system 20 includes a supercritical fluid pump 22 coupled to the supercritical fluid reservoir 21. The supercritical extractor system 20 includes a plurality of extractor chambers 23a-23b coupled to the supercritical fluid pump 22 and configured to receive a matrix for an extraction process and the supercritical fluid from the supercritical fluid pump. For example, the matrix may comprise a solid or/and an organic compound, such as cannabis or another plant body.

The supercritical extractor system 20 includes a plurality of evaporator chambers 24a-24b coupled to the plurality of the extractor chambers 23a-23b and configured to output an extractant from the matrix. Each evaporator chamber 24a-24b comprises a body defining a cavity therein, a cone 59a-59b within the cavity, and a plurality of arms coupled between an inner surface of the body and the cone. Although in this embodiment, each evaporator chamber 24a-24b includes a single cone 59a-59b, other embodiments (FIGS. 9A-9B) include more than one. The supercritical extractor system 20 includes a condenser 26 coupled between the plurality of evaporator chambers 24a-24b and the supercritical fluid reservoir 21, and a controller 25 coupled to the supercritical fluid pump 22, the plurality of extractor chambers 23a-23b, and the plurality of evaporator chambers and configured to monitor at least one characteristic during the extraction process.

Another aspect is directed to a method for making a supercritical extractor system 20. The method includes providing a supercritical fluid reservoir 21 configured to store a supercritical fluid, coupling a supercritical fluid pump 22 to the supercritical fluid reservoir, and coupling a plurality of extractor chambers 23a-23b to the supercritical fluid pump and configured to receive a matrix for an extraction process and the supercritical fluid from the supercritical fluid pump. The method includes coupling a plurality of evaporator chambers 24a-24b to the plurality of the extractor chambers 23a-23b and configured to output an extractant from the matrix. Each evaporator chamber 24a-24b comprises a body defining a cavity therein, at least one cone 59a-59b within the cavity, and a plurality of arms coupled between an inner surface of the body and the at least one cone. The method may include coupling a condenser 26 between the plurality of evaporator chambers 24a-24b and the supercritical fluid reservoir 21, and coupling a controller 25 to the supercritical fluid pump 22, the plurality of extractor chambers 23a-23b, and the plurality of evaporator chambers and configured to monitor at least one characteristic during the extraction process.

Yet another aspect is directed to a method for operating a supercritical extractor system 20. The supercritical extractor system 20 includes a supercritical fluid reservoir 21 configured to store a supercritical fluid, a supercritical fluid pump 22 coupled to the supercritical fluid reservoir, and a plurality of extractor chambers 23a-23b coupled to the supercritical fluid pump and configured to receive a matrix for an extraction process and the supercritical fluid from the supercritical fluid pump. The supercritical extractor system 20 includes a plurality of evaporator chambers 24a-24b coupled to the plurality of the extractor chambers 23a-23b and configured to output an extractant from the matrix. Each evaporator chamber 24a-24b comprises a body defining a cavity therein, at least one cone 59a-59b within the cavity, and a plurality of arms coupled between an inner surface of the body and the at least one cone. The supercritical extractor system 20 comprises a condenser 26 coupled between the plurality of evaporator chambers 24a-24b and the supercritical fluid reservoir 21. The method includes operating a controller 25, which is coupled to the supercritical fluid pump 22, the plurality of extractor chambers 23a-23b, and the plurality of evaporator chambers 24a-24b, to monitor at least one characteristic during the extraction process. The operating of the controller 25 may comprise configuring in real-time, or a predetermined coordination via software based programming stored in a memory therein.

Figure 2:
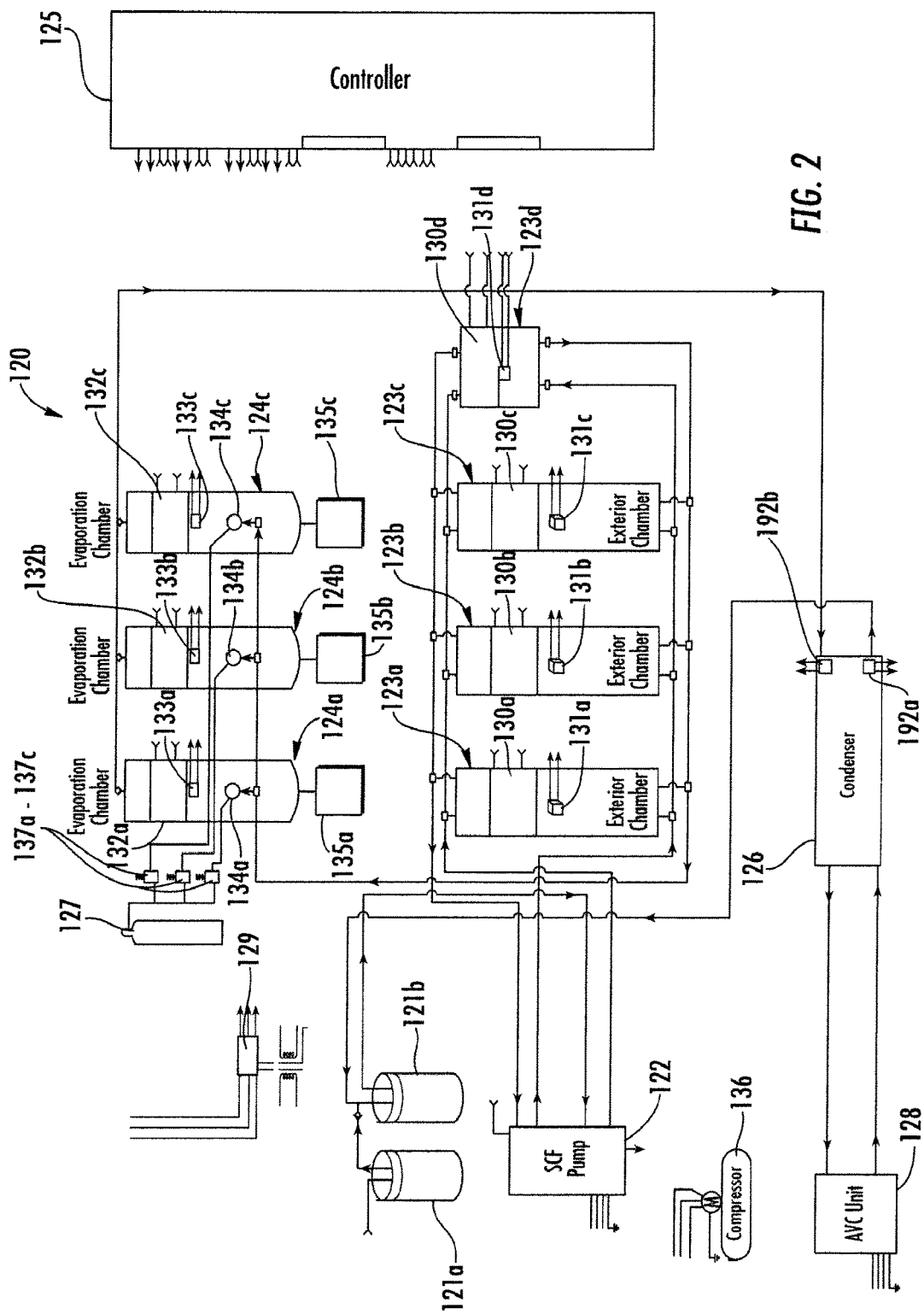
FIG. 2 is a schematic diagram of another embodiment of the supercritical extractor system, according to the present disclosure.
Figure 3:
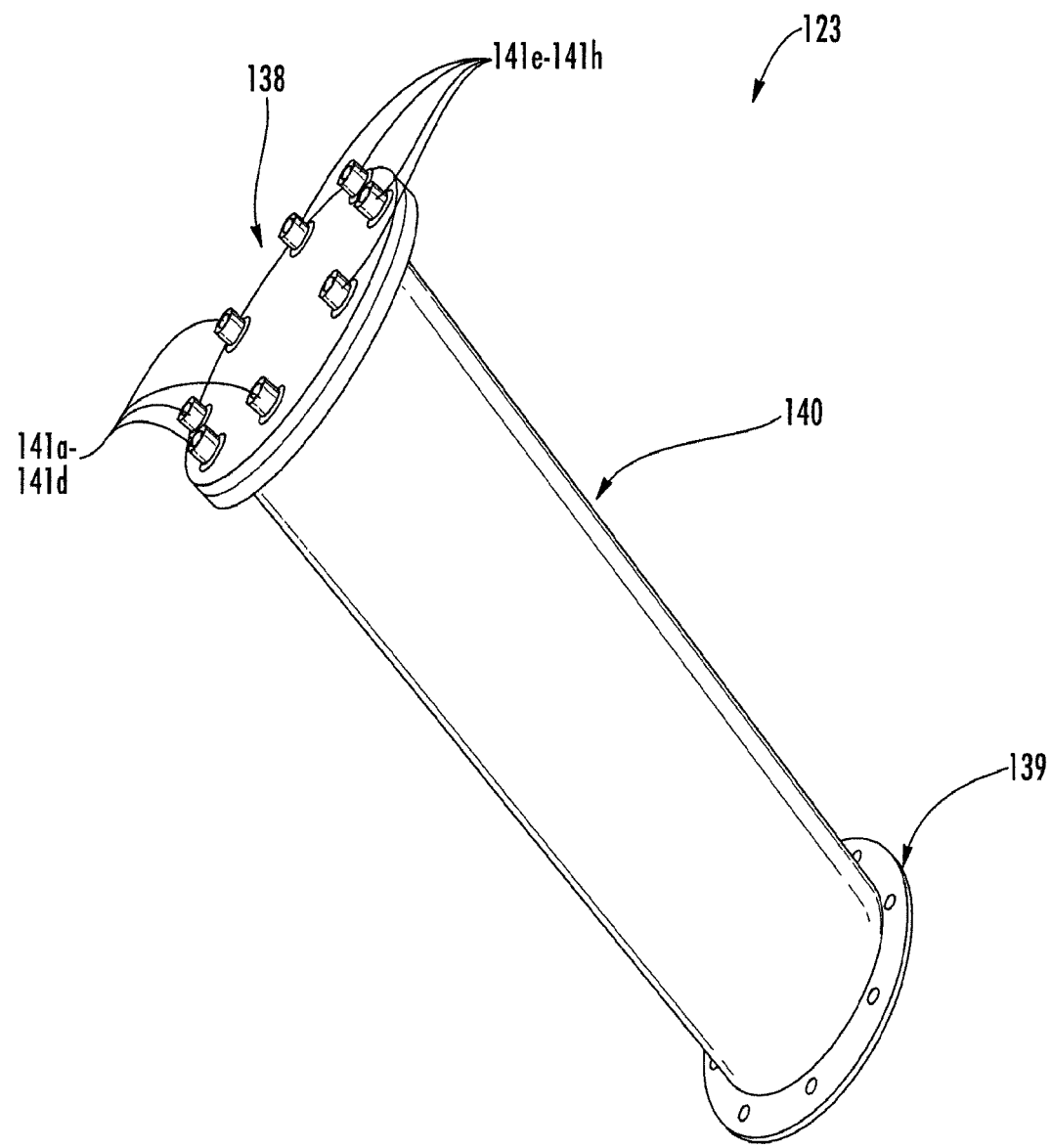
FIG. 3 is a schematic perspective view of an extractor chamber from the supercritical extractor system of FIG. 2.

Referring now additionally to FIG. 2, another embodiment of the supercritical extractor system 120 is now described. In this embodiment of the supercritical extractor system 120, those elements already discussed above with respect to FIG. 1 are incremented by 100.

This embodiment differs from the previous embodiment in that this supercritical extractor system 120 illustratively includes four extractor chambers 123a-123d. The plurality of extractor chambers 123a-123d comprises extractor chambers of differing capacities. Advantageously, this permits a smaller, boutique process on a smaller quantity with the smaller extractor chamber 123d. Also, each extractor chamber 123a-123d illustratively includes a heating element (e.g. silicon heating strip) 130a-130d, and a thermocouple 131a-131d coupled to the controller 125, which enables the aforementioned control of the extraction process.

This supercritical extractor system 120 illustratively includes three evaporator chambers 124a-124c, and a high pressure source (e.g. 3500 pounds per square inch (PSI)) 127. Each evaporator chamber 124a-124c illustratively includes a thermocouple 133a-133c coupled to the controller 125, a heating element (e.g. silicon heating strip) 132a-132c coupled to the controller, a drain point 135a-135c configured to output the extractant, and a back pressure valve 134a-134c coupled respectively to the high pressure source 127 via a plurality of pressure regulators 137a-137c.

As will be appreciated, the direction of supercritical fluid with extractant is from a top of each extractor chamber 123a-123d to a bottom, and thereafter transit to the evaporator chambers 124a-124c. In some embodiments, each extractor chamber 123a-123d illustratively includes a stirring pump (not shown) causing flow from bottom to top of each extractor chamber 123a-123d to enhance supercritical fluid circulation through the matrix, thereby improving efficiency of the extraction process.

In the illustrated embodiment, the at least one characteristic includes a plurality thereof via the aforementioned thermocouples 131a-131c, 133a-133c. The plurality of characteristics comprises respective temperature values for the plurality of extractor chambers 123a-123d and respective temperature values the plurality of evaporator chambers 124a-124c.

Additionally, the supercritical extractor system 120 illustratively includes an air conditioning unit 128 coupled to the condenser 126 and configured to remove heat energy from the $CO_2$ output from the plurality of evaporator chambers 124a-124c, and a power supply circuit 129 configured to provide power for the supercritical extractor system. The condenser 126 illustratively includes first and second thermocouples 192a-192b coupled to the controller 125.

The supercritical extractor system 120 illustratively includes a supercritical fluid pump 122 having a compressor 136 (e.g. 5 horsepower screw compressor). Also, the supercritical fluid reservoir illustratively includes first and second holding tanks 121a-121b. In this embodiment, the controller 125 may comprise a digital processor, or a finite state machine circuit.

Referring now to FIGS. 3-7B, the extractor chamber 123 illustratively includes a cylindrical body 140 defining a cavity 144 therein. The extractor chamber 123 illustratively includes first and second lids 138, 139, and the first lid 138 illustratively includes a plurality of fastening bolts 141a-141h coupling the first lid onto the cylindrical body 140. In some embodiments, the first and second lids 138, 139 are identical in structure, but in the illustrated embodiment, the first and second lids are asymmetric, a first being a higher pressure coupling lid, and a second being a lower pressure coupling lid.

Each extractor chamber 123a-123d includes a plurality of baskets (not shown) for carrying the matrix. The plurality of baskets (e.g. stainless steel baskets) may be stacked concentric within the cavity 144 of the cylindrical body 140 before the start of the extraction process.

Figure 4A:
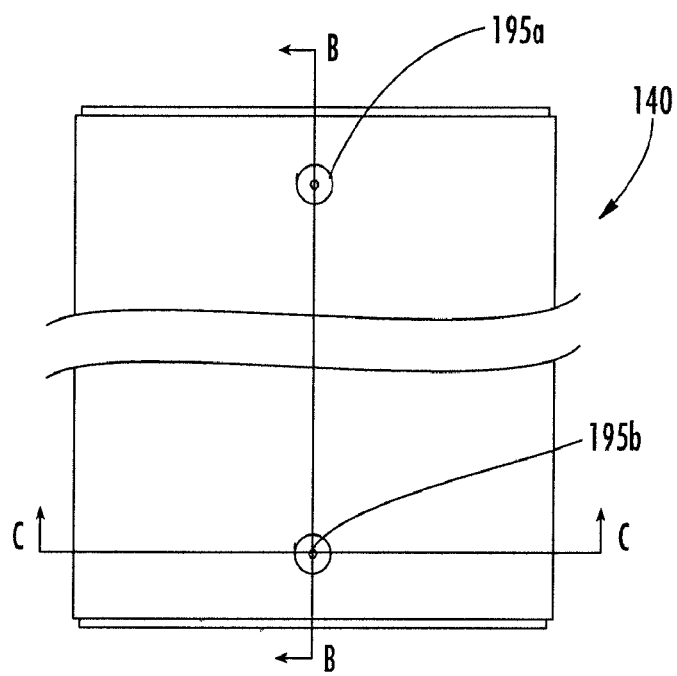
FIG. 4A is a schematic side elevational view of the extractor chamber from the supercritical extractor system of FIG. 2.
Figure 4B:
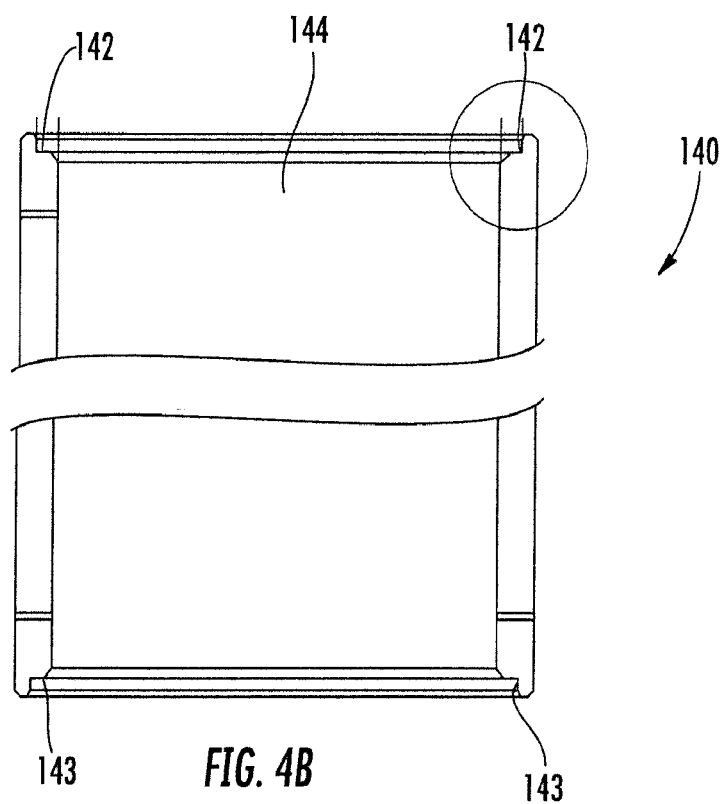
FIG. 4B is a schematic cross-sectional view of the extractor chamber from the supercritical extractor system of FIG. 4A along line B-B.
Figure 4C:
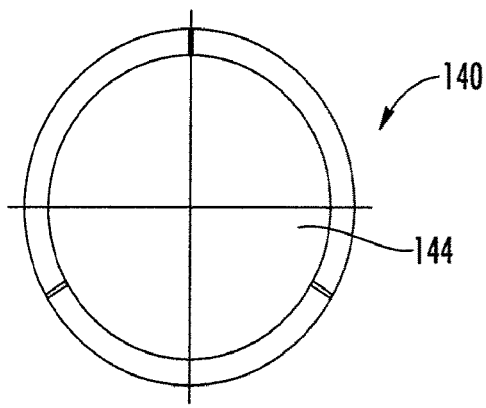
FIG. 4C is a schematic cross-sectional view of the extractor chamber from the supercritical extractor system of FIG. 4A along line C-C.
Figure 4D:
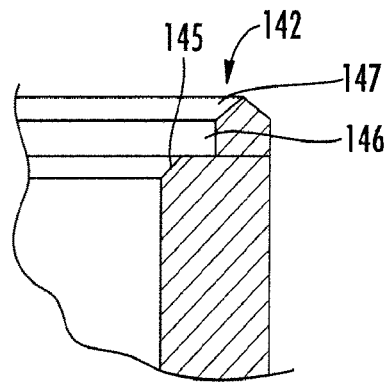
FIG. 4D is an enlarged portion of the schematic cross-sectional view of FIG. 4B.

As perhaps best seen in FIGS. 4B-4D, a first end of the cylindrical body 140 illustratively includes a flanged recess 142, and a second end of the body also illustratively includes a flanged recess 143. The flanged recess 142 illustratively includes a multi-step shoulder comprising first and second canted surfaces 145, 147, and a 90 degree step 146 therebetween. Also, the cylindrical body 140 illustratively includes a plurality of openings 195a-195b for probes from the thermocouples 131a-131c.

Figure 5A:
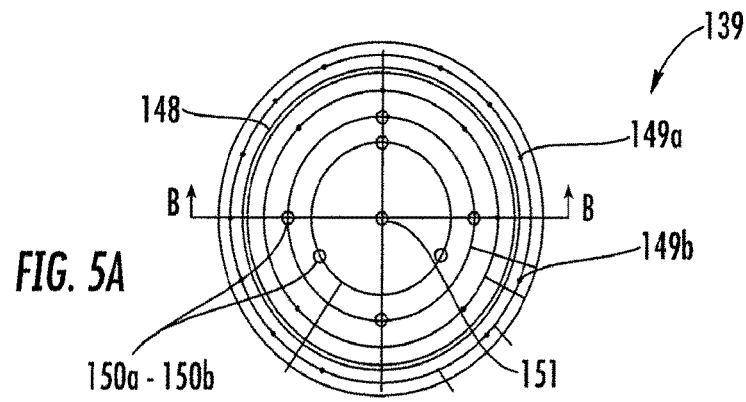
FIG. 5A is a schematic top plan view of a lid from the extractor chamber from the supercritical extractor system of FIG. 2.
Figure 5B:
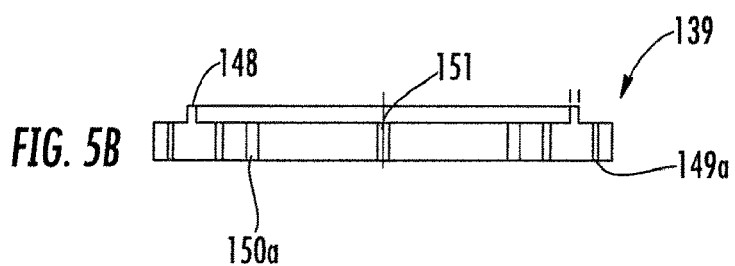
FIG. 5B is a schematic cross-sectional view of the lid from the chamber from the supercritical extractor system of FIG. 5A along line B-B.
Figure 5C:
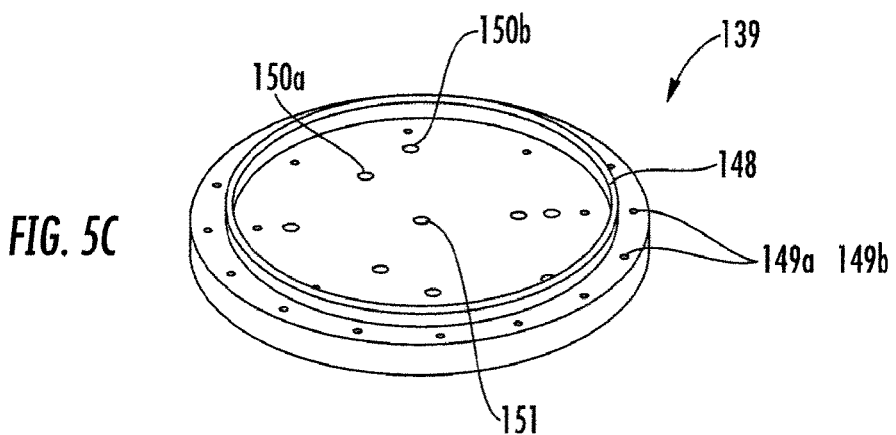
FIG. 5C is a schematic perspective view of the lid from the extractor chamber from the supercritical extractor system of FIG. 5A.
Figures 6A, 6B:
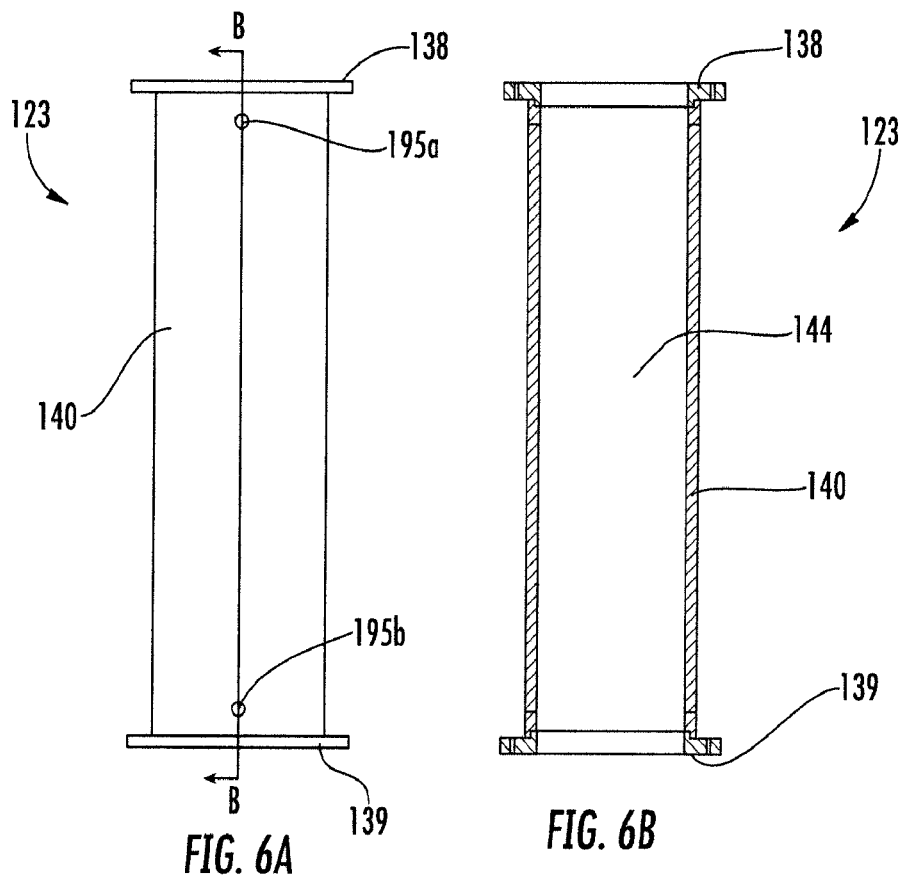
FIG. 6A is a schematic side elevational view of the extractor chamber from the supercritical extractor system of FIG. 2.
FIG. 6B is a schematic cross-sectional view of the extractor chamber from the supercritical extractor system of FIG. 6A along line B-B.
Figures 7A, 7B:
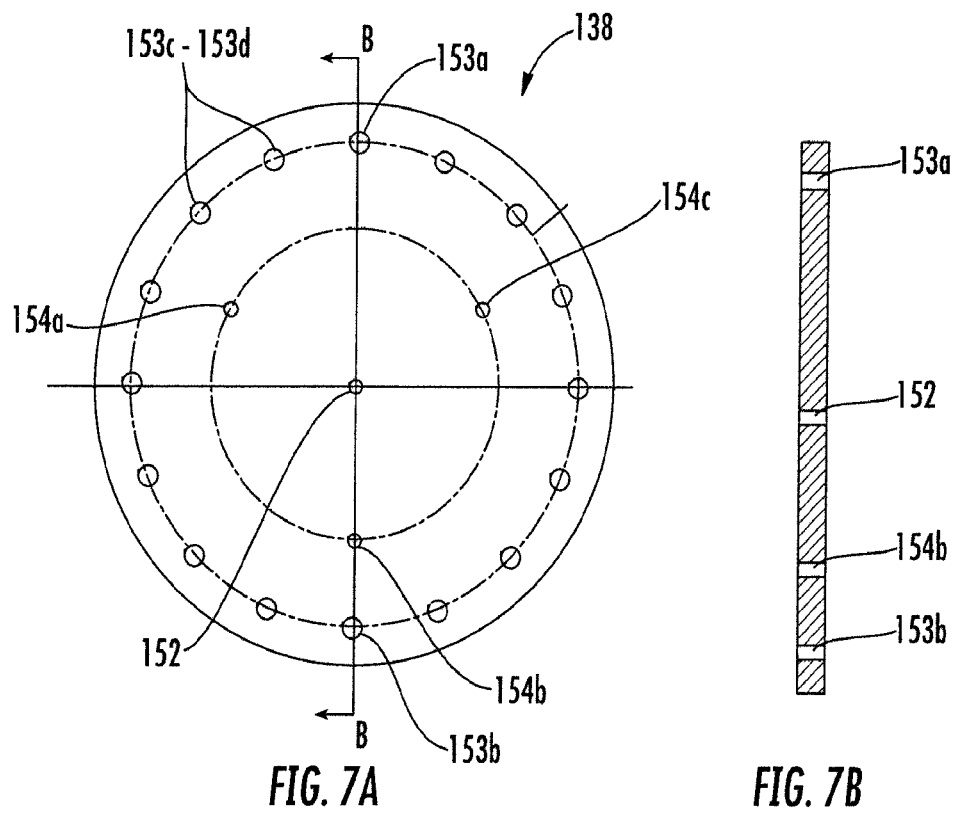
FIG. 7A is a schematic top plan view of another lid from the extractor chamber from the supercritical extractor system of FIG. 2.
FIG. 7B is a schematic cross-sectional view of the lid from the extractor chamber from the supercritical extractor system of FIG. 7A along line B-B.
Figure 8:
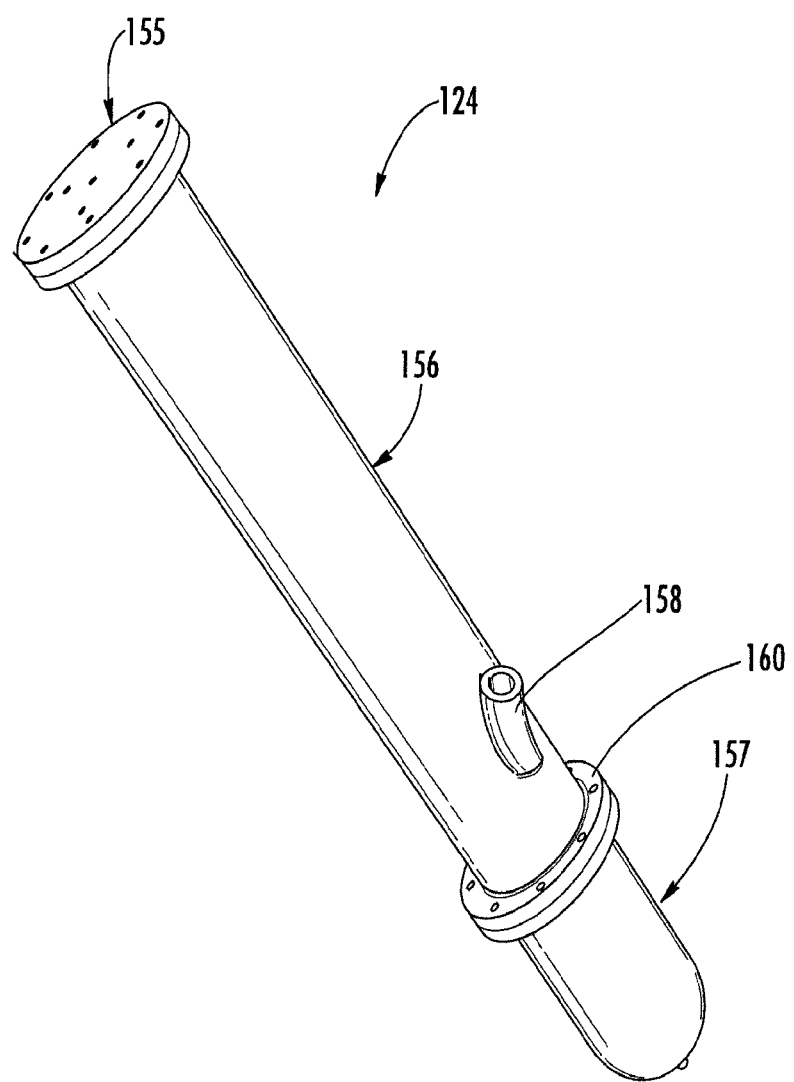
FIG. 8 is a schematic perspective view of an evaporator chamber from the supercritical extractor system of FIG. 2.

As perhaps best seen in FIGS. 5A-5C, the second lid 139 illustratively includes raised radial portion 148, a first plurality of openings 150a-150b, 151, and a second plurality of openings 149a-149b configured to receive fastening bolts fixing the second lid to the cylindrical body 140. As perhaps best seen in FIGS. 7A-7B, the first lid 138 illustratively includes a first plurality of openings 153a-153d for receiving the plurality of fastening bolts 141a-141h, and a second plurality of openings 154a-154c, 152. Although not shown here, the first lid 138 includes a filter (e.g. 40 micron filter) attached to a collar of the first lid.

Referring now to FIGS. 8-15B, the evaporator chamber 124 illustratively includes a cylindrical body 156 having first and second ends, a first lid 155 coupled to the first end, a rounded second end 157 coupled to the second end, and a collar 160 between the cylindrical body 156 and the rounded second end 157. The evaporator chamber 124 illustratively includes a back pressure tube 158.

As perhaps best seen in FIGS. 9A-9C, the evaporator chamber 124 illustratively includes a plurality of cones 159a-159c spaced longitudinally within a cavity 161 of cylindrical body 156. The cylindrical body 156 illustratively includes a plurality of openings 179a-179c respectively adjacent the plurality of cones 159a-159c for receiving probes from the thermocouples 133a-133c. As shown in FIG. 9C, the first end of the cylindrical body 156 illustratively includes a multi-step shoulder 162 for receiving the first lid 155.

Figure 10A:
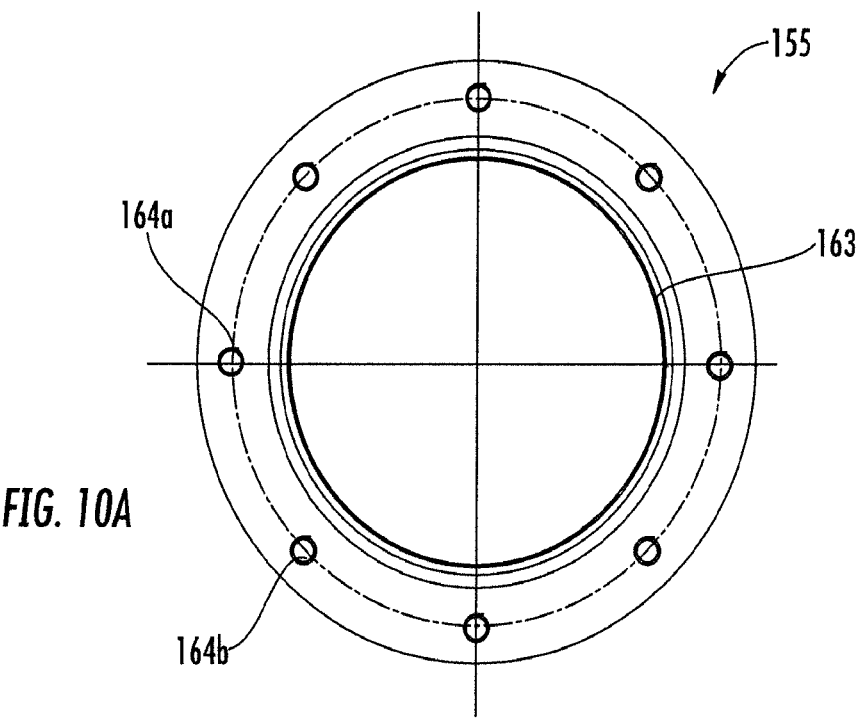
FIG. 10A is a schematic top plan view of a lid from the evaporator chamber from the supercritical extractor system of FIG. 2.
Figure 10B:
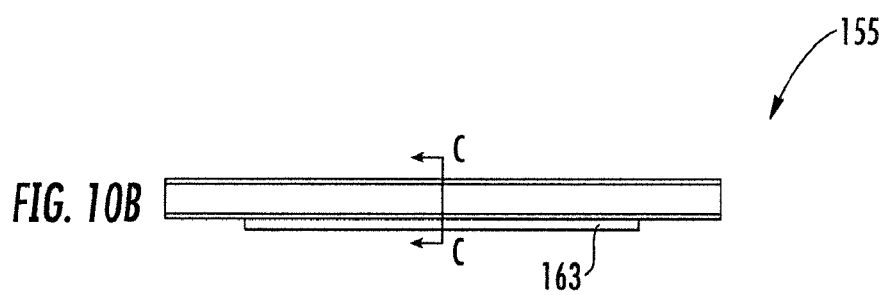
FIG. 10B is a schematic side elevational view of the lid from the evaporator chamber from the supercritical extractor system of FIG. 2.
Figure 10C:
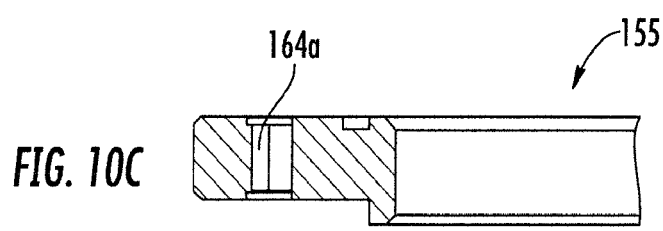
FIG. 10C is a schematic cross-sectional view of the lid from the evaporator chamber from the supercritical extractor system of FIG. 10B along line C-C.
Figure 11A:
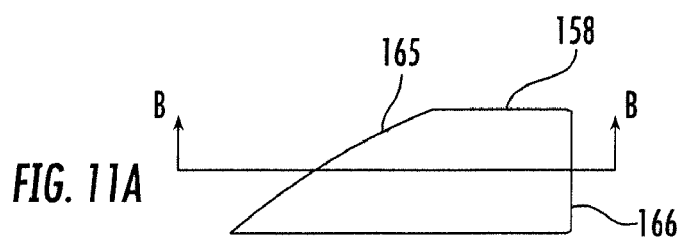
FIG. 11A is a schematic side elevational view of the back pressure tube from the evaporator chamber from the supercritical extractor system of FIG. 2.
Figure 11B:
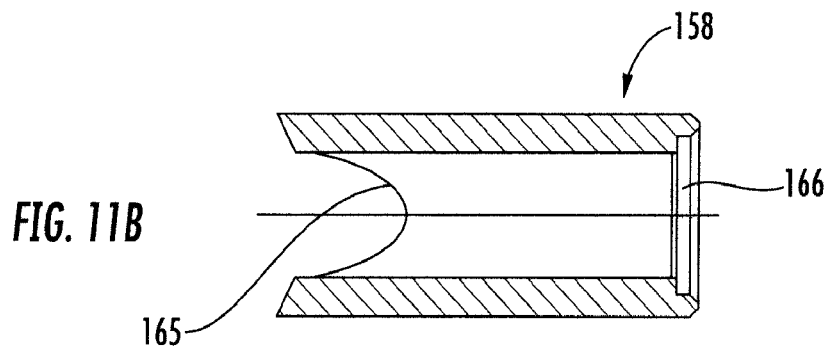
FIG. 11B is a schematic cross-sectional view of the back pressure tube from the supercritical extractor system of FIG. 11A along line B-B.
Figure 12A:
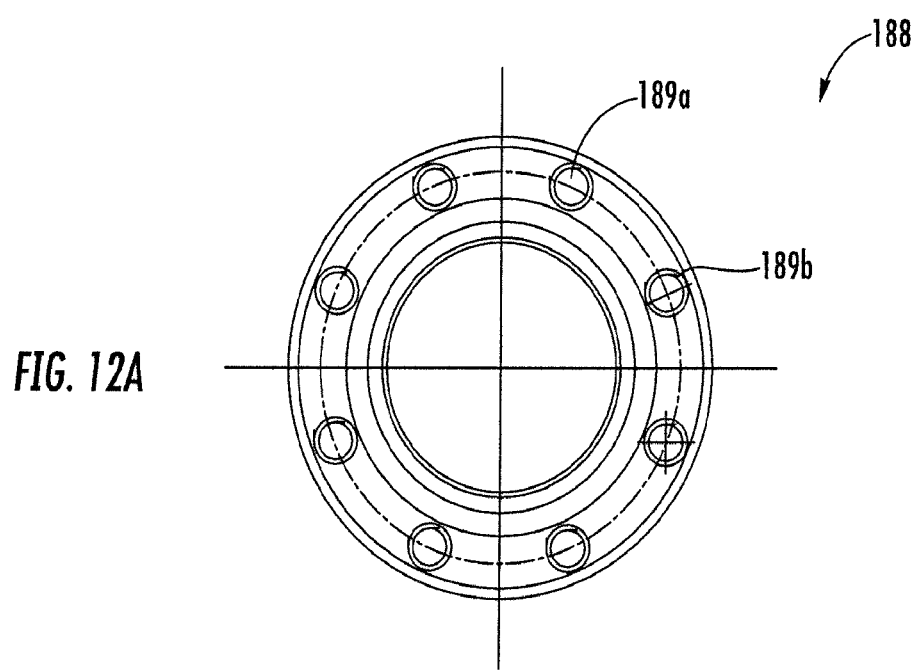
FIG. 12A is a schematic top plan view of a cap from the back pressure tube of the evaporator chamber from the supercritical extractor system of FIG. 2.
Figure 12B:
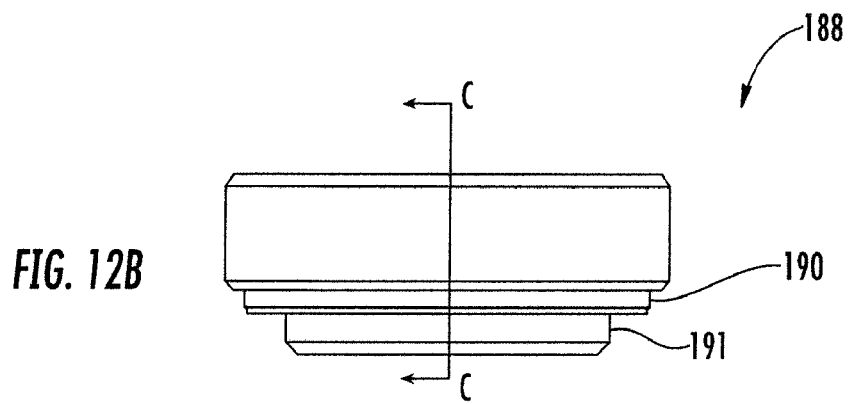
FIG. 12B is a schematic side elevational view of the cap from the back pressure tube of the evaporator chamber from the supercritical extractor system of FIG. 2.
Figure 12C:
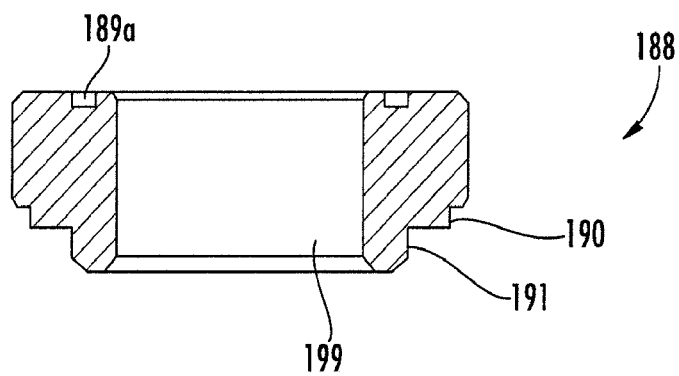
FIG. 12C is a schematic cross-sectional view of the cap from the back pressure tube of the evaporator chamber from FIG. 12B along line C-C.

Referring now in particular to FIGS. 10A-10C, the first lid 155 illustratively includes a plurality of openings 164a-164b for receiving fastening bolts for attachment to the cylindrical body 156, and a raised medial portion 163. Referring now to FIGS. 11A-12C, the back pressure tube 158 comprises first and second ends 165, 166. The first end 165 is attached to an outer lower portion of the cylindrical body 156 via a welding step, for example, and defines a curved edge. The second end 165 illustratively includes a multi-step shoulder. The back pressure tube 158 comprises a cap 188 received on the second end 166. The cap 188 illustratively includes a plurality of openings 189a-189b configured to receive fastening bolts for attachment to the second end 166, and defines a cavity 199 fluidly coupled to the cavity 161 of cylindrical body 156. As perhaps best seen in FIG. 12B, the cap 188 illustratively includes a multi-step radial shoulder 190-191, which fits the multi-step shoulder of the second end 166.

Figure 13A:
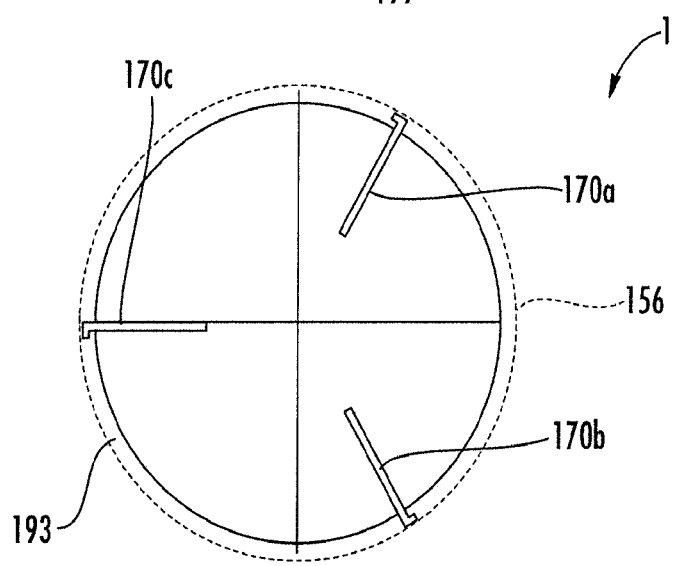
FIG. 13A is a schematic top plan view of a cone from the evaporator chamber from the supercritical extractor system of FIG. 2.
Figure 13B:
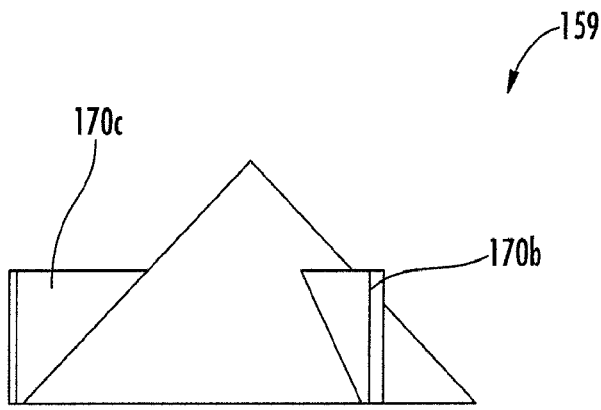
FIG. 13B is a schematic side elevational view of the cone from the evaporator chamber from the supercritical extractor system of FIG. 2.

Referring now to FIGS. 13A-13B, the evaporator chamber 124 illustratively includes a plurality of arms 170a-170c coupled between an inner surface of the cylindrical body 156 and the cone 159. Due to the feature that the plurality of arms 170a-170c extends radially past an annular edge of the cone 159, the cone 159 also defines an annular recess 193 between the cone and the inner surface of the cylindrical body 156. Helpfully, the cone 159 drives air against the inner surface of the cylindrical body 156 and through the annular recess 193, thereby improving efficiency of the extraction process.

Figure 14A:
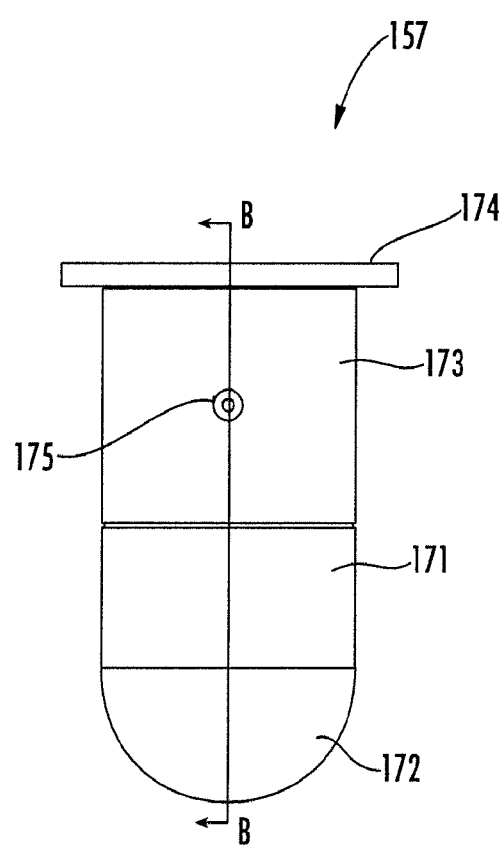
FIG. 14A is a schematic side elevational view of a portion of the evaporator chamber from the supercritical extractor system of FIG. 2.
Figure 14B:
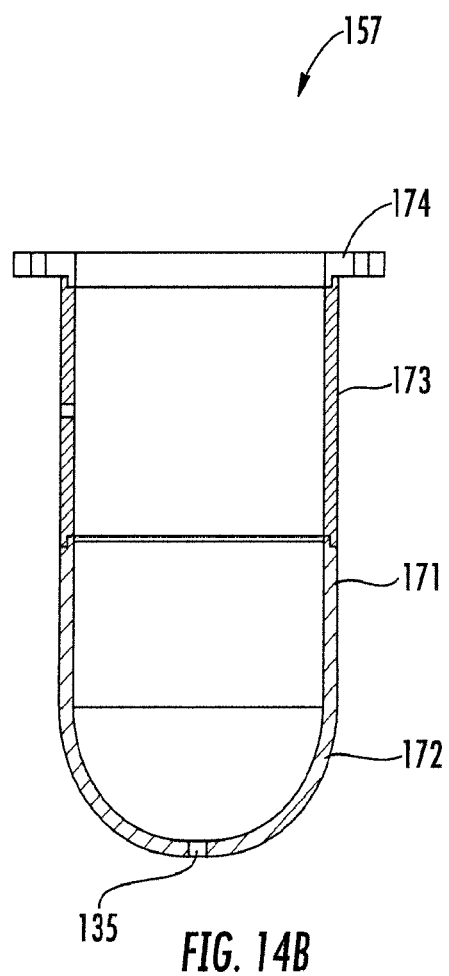
FIG. 14B is a schematic cross-sectional view of the portion of the evaporator chamber from the supercritical extractor system of FIG. 14A along line B-B.
Figure 15A:
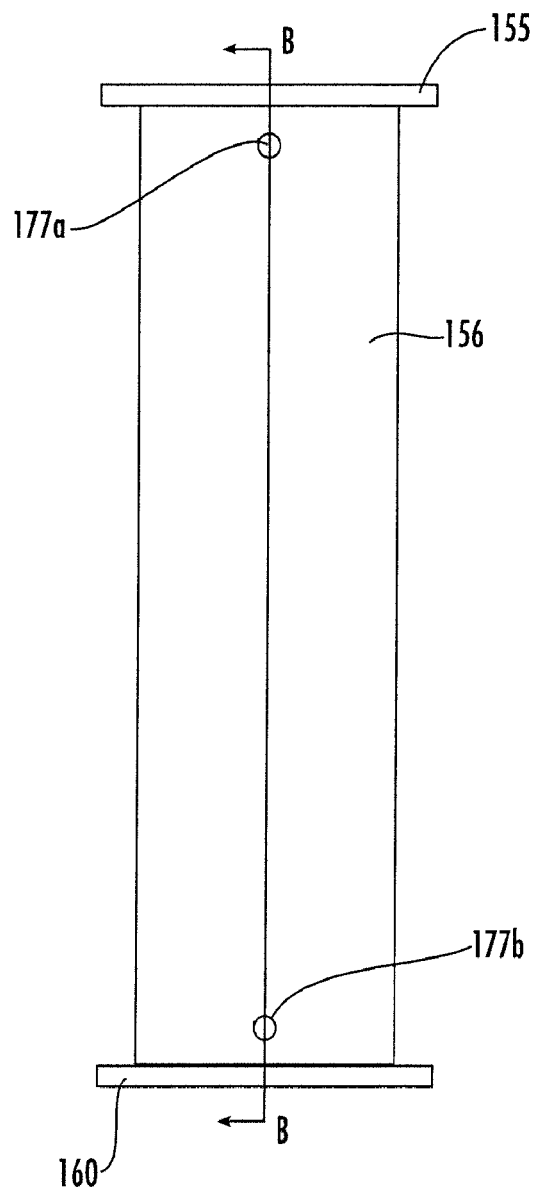
FIG. 15A is a schematic side elevational view of another portion of the evaporator chamber from the supercritical extractor system of FIG. 2.
Figure 15B:
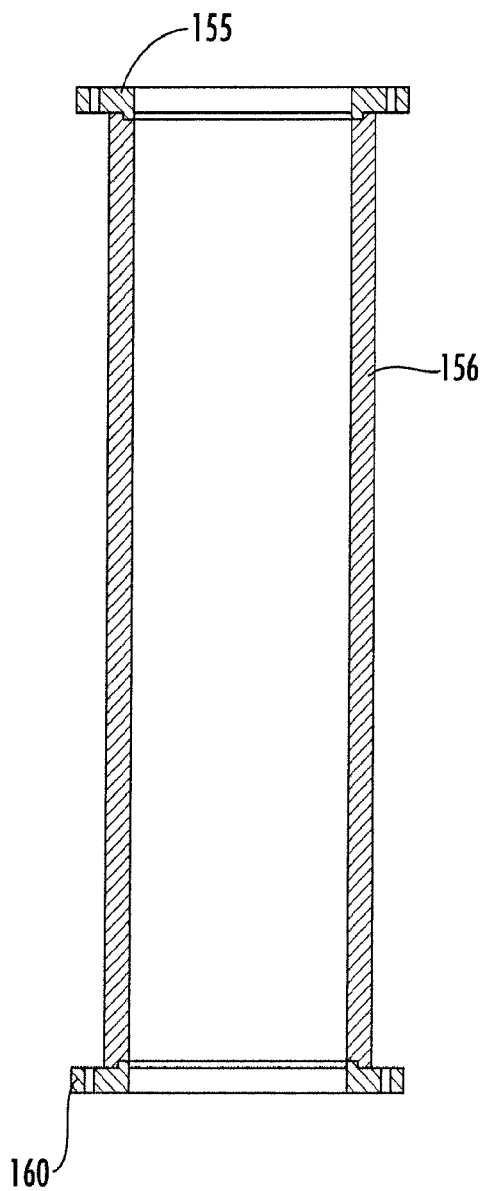
FIG. 15B is a schematic cross-sectional view of the other portion of the evaporator chamber from the supercritical extractor system of FIG. 15A along line B-B.

Referring now to FIGS. 14A-14B, the rounded second end 157 of the evaporator chamber 124 illustratively includes a collar 174 for attachment to the collar 160 of the cylindrical body 156, a medial portion 173 coupled to the collar 174 and defining an opening 175, and a lower bowl portion 171 coupled to the medial portion. The lower bowl portion 171 illustratively includes a curved end 172 defining a drain point 135 illustratively centered therein. As perhaps best seen in FIGS. 15A-15B, the cylindrical body 156 illustratively includes a plurality of openings 177a-177b for receiving additional probes from the thermocouple 133a-133c.

Figure 16:
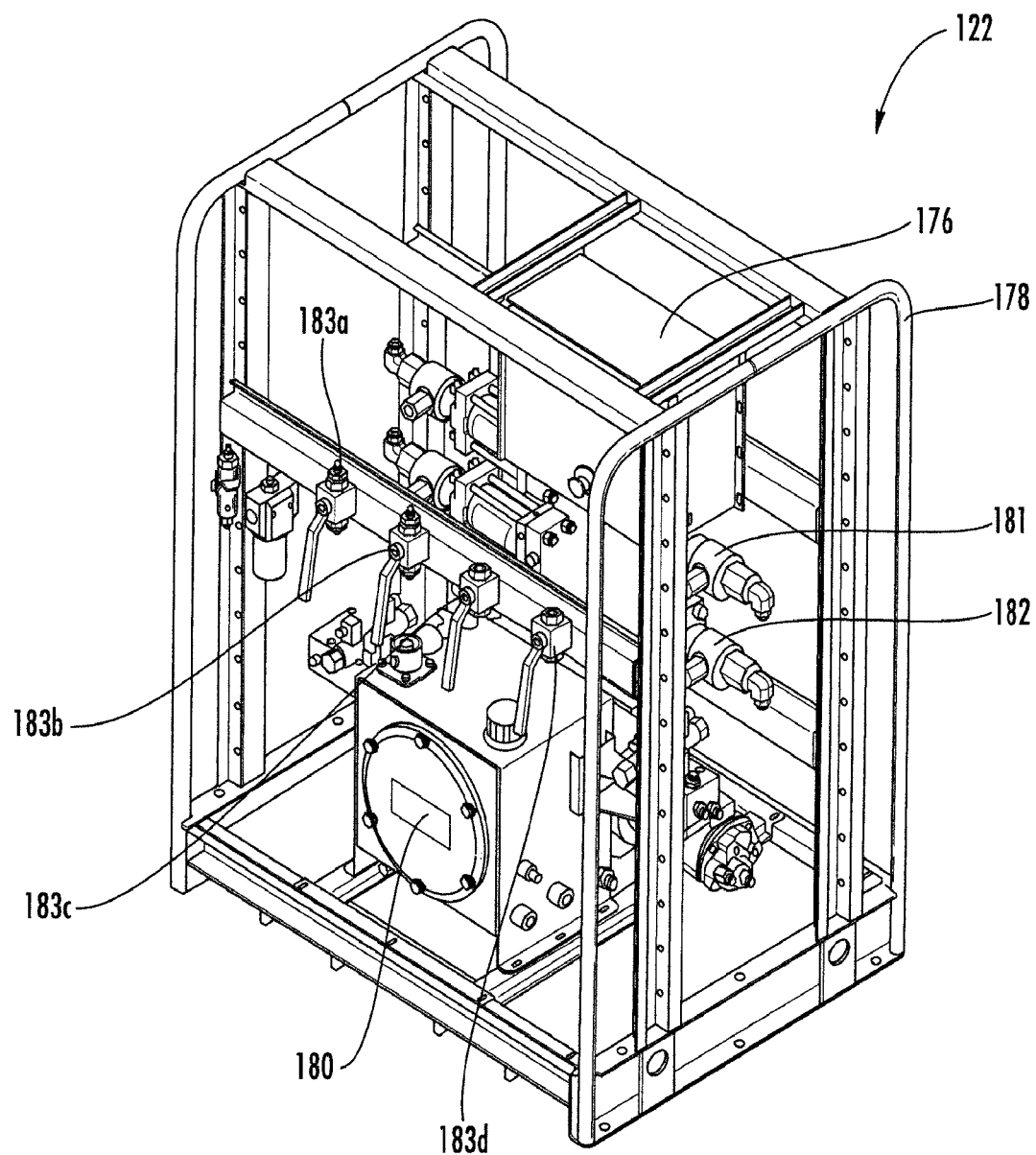
FIG. 16 is a schematic perspective view of a supercritical fluid pump from the supercritical extractor system of FIG. 2.
Figure 17:
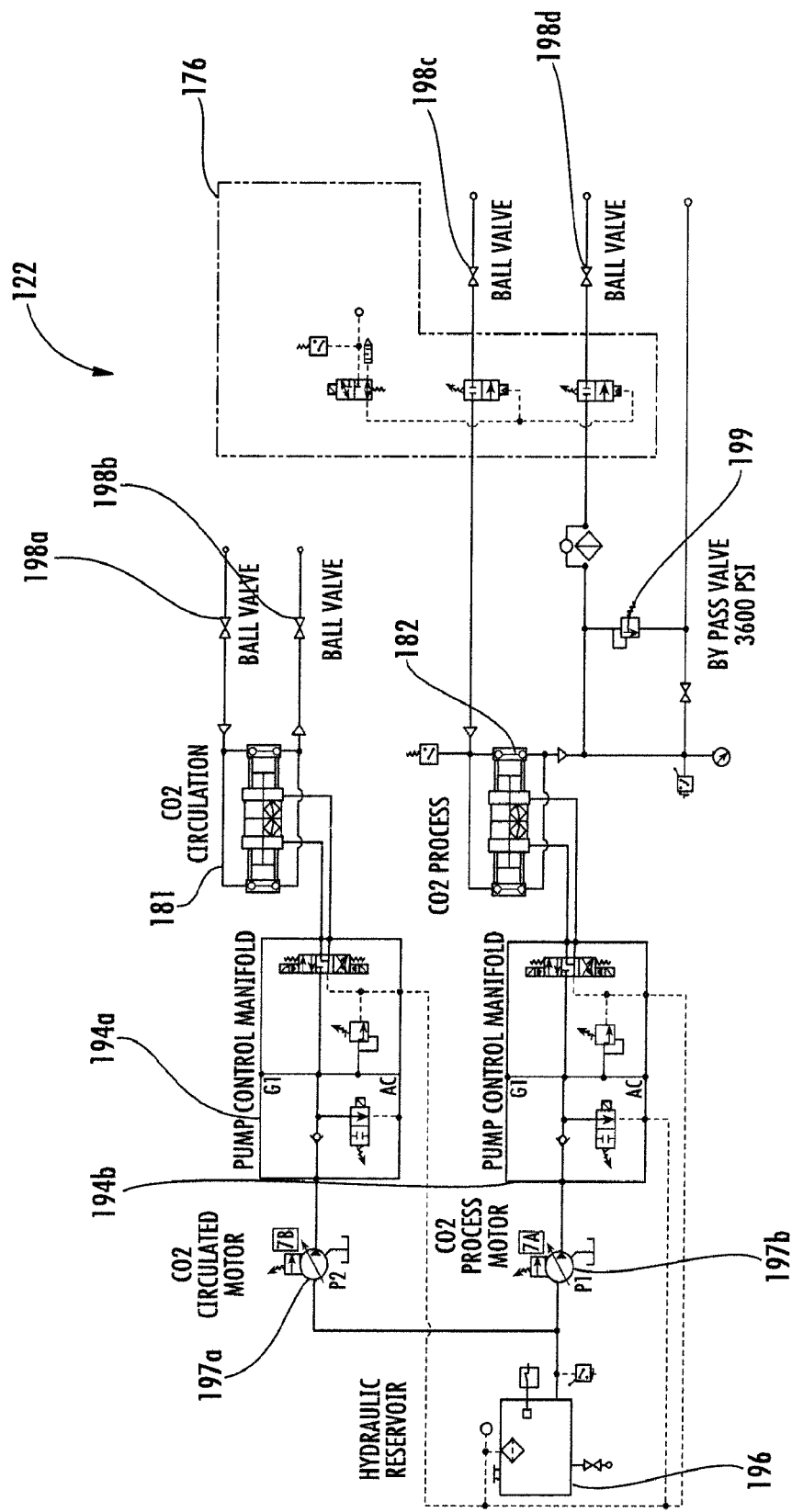
FIG. 17 is a schematic circuit diagram of the supercritical fluid pump from the supercritical extractor system of FIG. 2.

Referring now to FIGS. 16-17, the supercritical fluid pump 122 illustratively includes a frame 178, first and second pumps 181-182 carried by the frame, and an hydraulic reservoir tank (motor not shown) (e.g. 5 horsepower 3 phase motor) 180 coupled to the first and second pumps and carried by the frame. The supercritical fluid pump 122 illustratively includes control circuitry 176 coupled to the first and second pumps 181-182 and the electric motor 180, and a plurality of valves 183a-183d, and first and second manifolds 194a-194b coupled to the first and second pumps. The supercritical fluid pump 122 illustratively includes a hydraulic reservoir 196, first and second $CO_2$ motors 197a-197b coupled to the hydraulic reservoir, and a bypass valve 199 coupled to the second pump 182. The supercritical fluid pump 122 illustratively includes first plurality of ball valves 198a-198b coupled to the first pump, and second plurality of ball valves 198c-198d coupled to the control circuitry.

Figure 18:
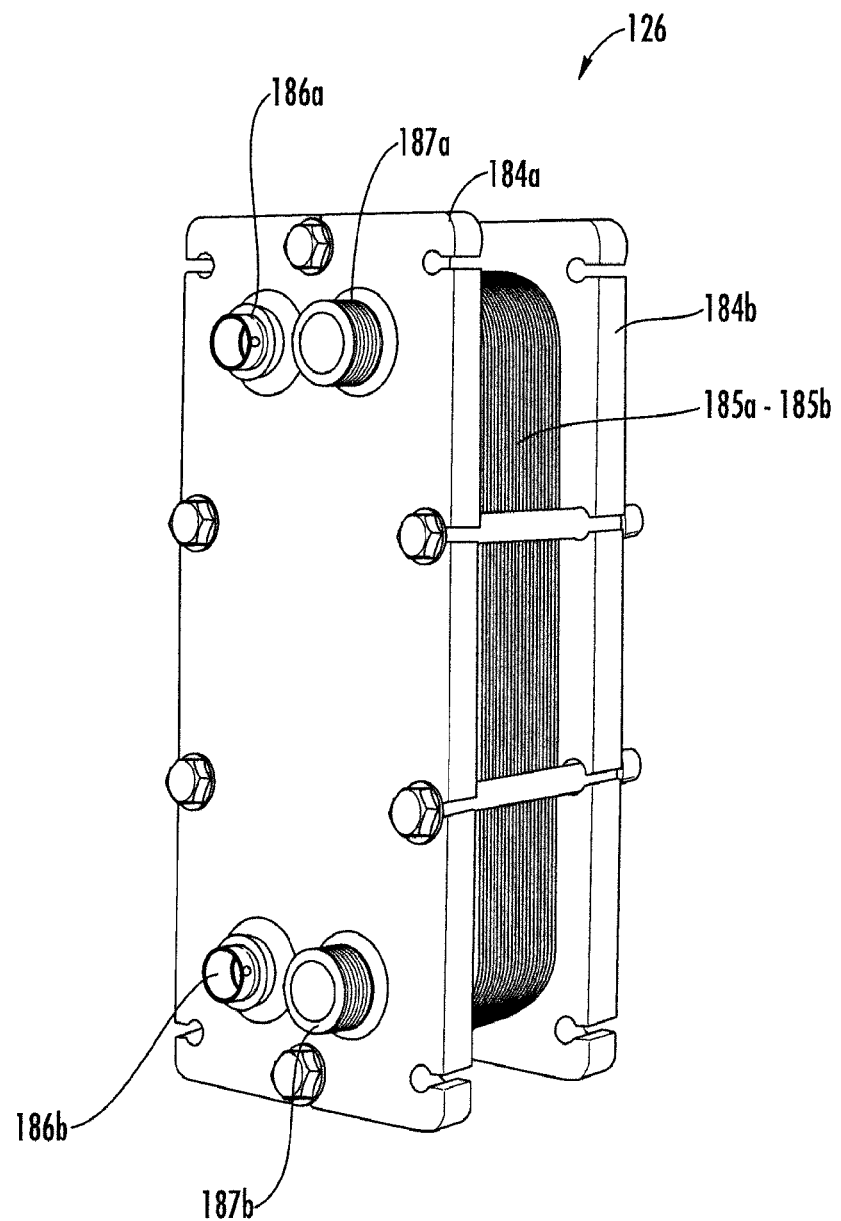
FIG. 18 is a schematic perspective view of a condenser from the supercritical extractor system of FIG. 2.

Referring now to FIG. 18, the condenser 126 illustratively includes a plate heat exchanger with pluralities of inlets and outlets 186a-187b, and a plurality of cooling plates 185a-185b. The condenser 126 illustratively includes first and second frame members 184a-184b for carrying the plurality of cooling plates 185a-185b.

Advantageously, the supercritical extractor system 120 disclosed herein is readily mobilized and mounted onto a vehicle trailer, such as 33 foot gooseneck trailer. This enables very flexible use in agrarian applications without investment in permanent equipment. Indeed, some users may simply lease the supercritical extractor system 120 for a short period. Moreover, the supercritical extractor system 120 may operate quite efficiently, completing the extraction process on 3 lb. of solid matrix in 2.5 hours.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A supercritical extractor system comprising:
    a supercritical fluid reservoir configured to store a supercritical fluid;
    a supercritical fluid pump coupled to said supercritical fluid reservoir;
    a plurality of extractor chambers coupled to said supercritical fluid pump and configured to receive a matrix for an extraction process and the supercritical fluid from said supercritical fluid pump;
    a plurality of evaporator chambers respectively coupled in parallel to said plurality of said extractor chambers and configured to output an extractant from the matrix, each evaporator chamber comprising
        a body defining a cavity therein,
        a plurality of aligned cones within the cavity, and
        a plurality of arms coupled between an inner surface of said body and each of said plurality of aligned cones;
    a condenser coupled between said plurality of evaporator chambers and said supercritical fluid reservoir; and
    a controller coupled to said supercritical fluid pump, said plurality of extractor chambers, and said plurality of evaporator chambers and configured to monitor at least one characteristic during the extraction process.

2. The supercritical extractor system of claim 1 wherein the supercritical fluid comprises supercritical $CO_2$.

3. The supercritical extractor system of claim 1 wherein said body comprise a cylindrical body.

4. The supercritical extractor system of claim 3 wherein each aligned cone defines an annular recess between a respective aligned cone and the inner surface of said cylindrical body.

5. The supercritical extractor system of claim 1 wherein each extractor chamber comprises a cylindrical body defining a cavity therein.

6. The supercritical extractor system of claim 1 wherein said plurality of extractor chambers comprises extractor chambers of differing capacities.

7. The supercritical extractor system of claim 1 wherein said condenser comprises a plate heat exchanger.

8. The supercritical extractor system of claim 1 wherein said supercritical fluid pump comprises a frame, a pump carried by said frame, and an electric motor coupled to said pump and carried by said frame.

9. The supercritical extractor system of claim 1 wherein the at least one characteristic comprises a plurality thereof comprising respective temperature values for said plurality of extractor chambers and respective temperature values said plurality of evaporator chambers.

10. A supercritical extractor system comprising:
a supercritical $CO_2$ reservoir configured to store supercritical $CO_2$ fluid;
a supercritical $CO_2$ pump coupled to said supercritical $CO_2$ reservoir;
a plurality of extractor chambers coupled to said supercritical $CO_2$ pump and configured to receive a matrix for a $CO_2$ extraction process and the supercritical $CO_2$ fluid from said supercritical $CO_2$ pump;
a plurality of evaporator chambers respectively coupled in parallel to said plurality of said extractor chambers and configured to output an extractant from the matrix, each evaporator chamber comprising
a cylindrical body defining a cavity therein,
a plurality of aligned cones within the cavity, and
a plurality of arms coupled between an inner surface of said cylindrical body and each of said plurality of aligned cones;
a condenser coupled between said plurality of evaporator chambers and said supercritical $CO_2$ reservoir; and
a controller coupled to said supercritical $CO_2$ pump, said plurality of extractor chambers, and said plurality of evaporator chambers and configured to monitor at least one characteristic during the $CO_2$ extraction process.

11. The supercritical extractor system of claim 10 wherein each aligned cone defines an annular recess between a respective aligned cone and the inner surface of said cylindrical body.

12. The supercritical extractor system of claim 10 wherein each extractor chamber comprises a cylindrical body defining a cavity therein.

13. The supercritical extractor system of claim 10 wherein said plurality of extractor chambers comprises extractor chambers of differing capacities.

14. The supercritical extractor system of claim 10 wherein said condenser comprises a plate heat exchanger.

15. The supercritical extractor system of claim 10 wherein said supercritical $CO_2$ pump comprises a frame, a pump carried by said frame, and an electric motor coupled to said pump and carried by said frame.

16. A method for making a supercritical extractor system comprising:
providing a supercritical fluid reservoir configured to store a supercritical fluid;
coupling a supercritical fluid pump to the supercritical fluid reservoir;
coupling a plurality of extractor chambers to the supercritical fluid pump and configured to receive a matrix for an extraction process and the supercritical fluid from the supercritical fluid pump;
coupling a plurality of evaporator chambers respectively in parallel to the plurality of the extractor chambers, the plurality of evaporator chambers configured to output an extractant from the matrix, each evaporator chamber comprising
a body defining a cavity therein,
a plurality of aligned cones within the cavity, and
a plurality of arms coupled between an inner surface of the body and each of the plurality of aligned cones;
coupling a condenser between the plurality of evaporator chambers and the supercritical fluid reservoir; and
coupling a controller to the supercritical fluid pump, the plurality of extractor chambers, and the plurality of evaporator chambers, the controller configured to monitor at least one characteristic during the extraction process.

17. The method of claim 16 wherein the supercritical fluid comprises supercritical $CO_2$.

18. The method of claim 16 wherein the body comprise a cylindrical body.

19. The method of claim 18 wherein each aligned cone defines an annular recess between a respective aligned cone and the inner surface of the cylindrical body.

20. The method of claim 16 wherein each extractor chamber comprises a cylindrical body defining a cavity therein.

* * * * *